Dec. 6, 1966      F. E. MILLER ET AL      3,289,899
GLASS SPHERE DISPENSER SPREADER FOR HIGHWAY MARKING
Filed Feb. 25, 1965                           2 Sheets-Sheet 1
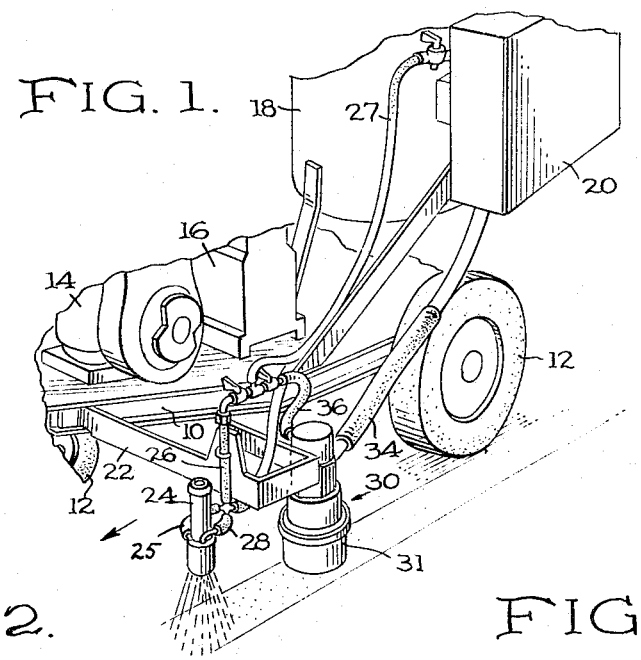
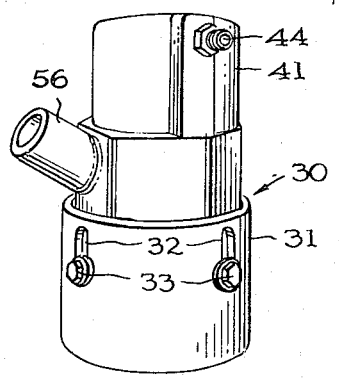
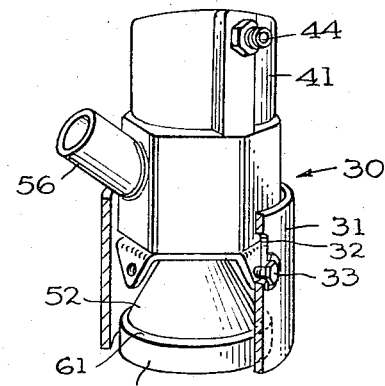
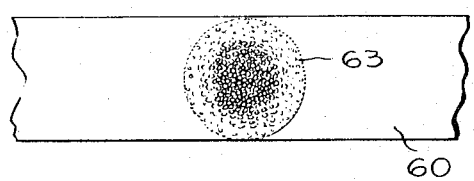
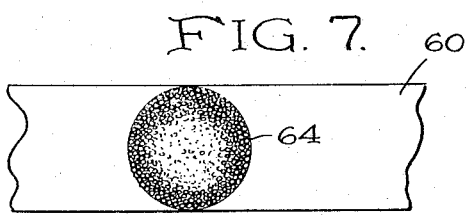
INVENTORS
FRANK E. MILLER
JAMES M. CARRUTHERS
BY  KARL W. FLOCKS
                   ATTORNEY Dec. 6, 1966  F. E. MILLER ET AL  3,289,899
GLASS SPHERE DISPENSER SPREADER FOR HIGHWAY MARKING
Filed Feb. 25, 1965  2 Sheets-Sheet 2

INVENTORS
FRANK E. MILLER
JAMES M. CARRUTHERS

BY Karl W. Flocks
ATTORNEY

United States Patent Office 3,289,899
Patented Dec. 6, 1966

3,289,899
GLASS SPHERE DISPENSER SPREADER
FOR HIGHWAY MARKING
Frank E. Miller, Huntingdon, and James M. Carruthers, Homer City, Pa., assignors to Wald Industries, Inc., Huntingdon, Pa., a corporation of Pennsylvania
Filed Feb. 25, 1965, Ser. No. 435,211
4 Claims. (Cl. 222—459)

The present invention relates to highway marking apparatus and more particularly to a glass bead dispenser that is adapted to convey glass beads from a container and uniformly distribute the glass beads or spheres on a freshly applied roadway marking thereby forming a reflectorized traffic stripe on the roadway.

In the application of traffic lines to highways it is generally desirable to apply a reflectorized material in the form of small glass spheres or beads to the highway stripe for increasing nighttime visibility and further extending the life of the stripe. The small glass beads may be applied with a paint binder in a single operation or an alternative method of application is to apply the paint binder separately and then immediately follow the paint binder with an application of the small glass beads which are dispensed by gravity flow thereon.

The present invention seeks to provide a glass bead dispenser which incorporates a diaphragm controlled valve that enables the bead dispenser to be located in close proximity to the surface being marked.

Another object of the present invention is to provide a glass bead dispensing apparatus that is adapted to distribute glass beads at a uniform rate and with a controlled distribution thereof on the surface being marked.

It is furthermore an object of the present invention to provide a glass bead dispenser of a form by which the bounce of the glass beads and the area on which they drop may be more easily controlled and also to eliminate most of the effect of air currents on the fall of the glass beads to the highway marking material.

An advantage of the glass bead dispenser of the present invention lies in that it allows a glass bead to drop by gravity perpendicular to the road surface from a slanted cone which spreads the material. This permits a better coverage of glass beads over the marking material and allows the dispenser to be mounted closer to the surface to be covered.

Other objects and the nature and advantages of the instant invention will be apparent from the following description taken in conjunction with the accompanying drawings wherein:

FIG. 1 is a perspective view of a highway marking machine of the self-propelled type illustrating the location of the bead dispensing apparatus embodied in the present invention mounted thereon;

FIG. 2 is an enlarged perspective view of the bead dispensing apparatus of the present invention;

FIG. 3 is a partially cut away view of the bead dispensing apparatus shown in FIG. 2;

FIGS. 6 and 7 are top plan views of distribution patterns of glass beads on a highway striping material.

Figure 4:
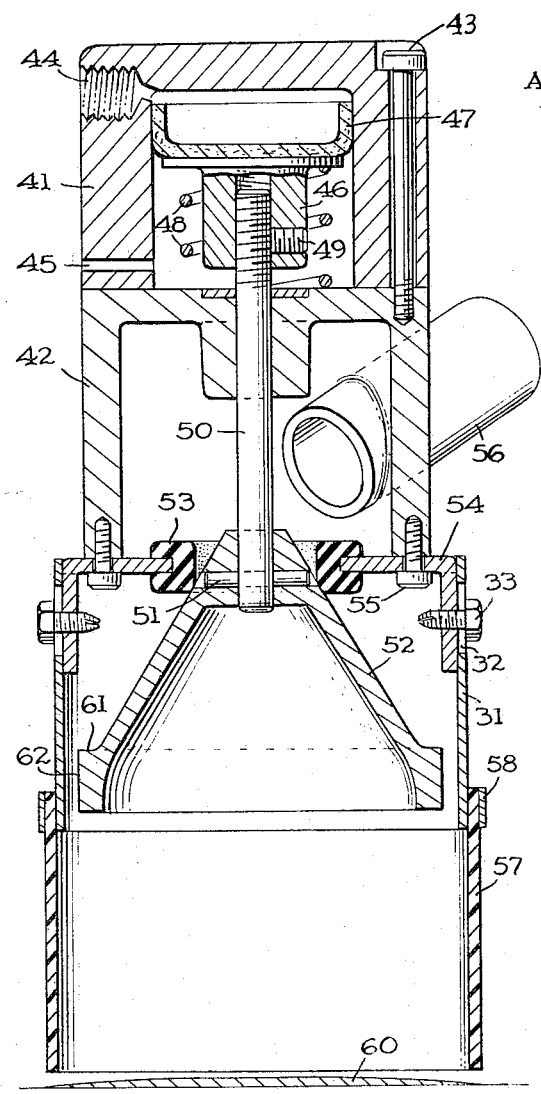
FIG. 4 is a sectioned elevation of the bead dispensing apparatus of the present invention.

Referring now to the drawings and particularly FIG. 1, a highway marking machine of the self-propelled type is illustrated and includes a frame 10 upon which wheels 12 are rotatably mounted at the front and rear thereof. The marking machine may be of the triwheel type, a small wheel being positioned at the front thereof and the operator may either walk behind the machine or ride on a rear platform mounted on the rear thereof. Also mounted on the frame 10 is an internal combustion engine 14 for supplying the operating power for the machine and a compressor 16 driven by the engine 14 for supplying the operating air for the dispensing equipment. Mounted rearwardly of the engine 14 and compressor 16 on a suitable support secured to the frame 10 is a receptacle 18 which contains the paint binder. A receptacle 20 is located adjacent the receptacle 18 and contains a supply of small light reflecting beads or spheres of glass. Extending outwardly from the frame 10 and secured thereto is a subframe assembly 22 that has mounted thereon a paint gun 24. The paint gun 24 communicates with the paint container 18 through a paint conducting conduit 25. The paint gun 24 further communicates with a source of air pressure through lines 26 and 28 which are operatively connected to a flexible air supply hose 27 through a T coupling. The air supply hose 27 is connected to a suitable air control valve within easy reach of the operator. Secured to the sub-frame assembly 22 by a clamping bracket or similar means is a glass bead dispenser generally indicated at 30. The bead dispenser 30 is positioned directly behind the paint gun 24 and is adapted to distribute a uniform supply of glass beads onto the freshly applied paint stripe during the striping operation. The bead dispenser 30 is continuously supplied with the glass beads and for this purpose communicates with the bead receptacle 20 through a flexible conduit 34. The bead dispenser 30 is adapted to be air operated for instantaneous control as will be described hereinafter and further communicates with a source of air pressure through an air line 36 operatively connected thereto, the air line 36 communicating with the flexible air hose 27 through the T coupling.

It is understood that the operator of the striping machine controls the operation thereof so that the machine is propelled along the road to be marked at a relatively low rate of speed, the direction of travel being in the direction of the arrow shown in FIG. 1. As the machine moves along the surface of the road the paint gun 24 applies a paint stripe thereon and immediately thereafter glass beads are dispensed by the bead dispenser 30 on the freshly applied paint stripe.

Figure 5:
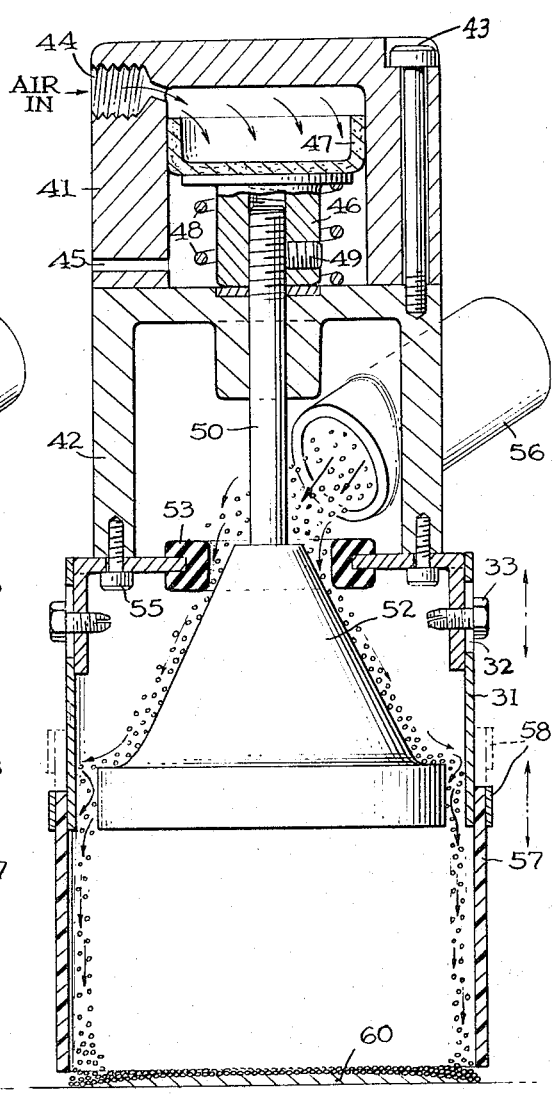
FIG. 5 is a partially sectioned view of the bead dispensing apparatus while in use.

FIGS. 2 and 3 are enlarged views of the glass bead dispenser 30 without the lower, flexible air shield 57 attached thereto. The dispenser 30 is shown in sectioned views of FIGS. 4 and 5 with air shield 57 thereto attached. In FIGS. 2 and 3 the attachment of the shroud 31 to dispenser 30 and the means by which it may be adjusted are shown both in full perspective and in a cut away view. FIG. 4 is a still further enlarged view in cross section of the glass bead dispenser 30. In this figure dispenser 30 is in a closed position whereby no glass beads may be dispersed onto the painted highway marking stripe 60. FIG. 5 shows the same dispenser 30 in an open position with glass beads being dispersed on the painted highway marking stripe 60 therebelow.

A shown in these figures, the air cylinder body 41 is connected to the glass sphere chamber 42 by means of screws 43 of which only one is shown in the figures. This forms a subassembly air chamber with an inlet 44 at the top and an exhaust port 45 at the bottom to relieve pressure against operator 46. This operator 46 has a leather cup 47 which provides a seal for inlet air to prevent the air from bypassing the operator 46, and a spring 48 to return it to a primary position when not in operation. A set screw 49 locks the operator which is threaded internally into position to valve or spreader shaft 50 which is threaded externally. The space between the operator 46 and the glass sphere chamber 42 determines the amount of travel of spreader shaft 50. A lock pin 51 holds the valve or spreader 52 to spreader shaft 50. The spreader 52 is seated in a grommet 53 which is fitted in a bottom plate 54 of glass sphere chamber 42. This bottom plate 54 is fastened to the glass sphere chamber 42 by means of machine screws 55. The glass sphere chamber 42 is supplied by an inlet pipe 56. A shroud 31 vertically adjustable by means of slots 32 which accommodate machine screws 33 is fastened to the bottom plate 54. A flexible air shield 57 is clamped to the shroud 31 with an adjustable diameter band clamp 58.

The spreader or valve 52 of the present invention is formed with a frusto-conical surface having a lip portion near the lower end of the conical slope and perpendicular walls 62 depending from the outer edge of lip portion 61.

In the operation of the glass bead dispenser 30 of the present invention a valve is opened either mechanically, manually, electrically, hydraulically, and/or automatically to permit a supply of air to enter air inlet 44 of cylinder body 41 and cause pressure against the operator 46 which is forced downwardly until the bottom of the operator 46 rests on the top of the glass sphere chamber 42. This vertical motion is transmitted to the spreader shaft 50 and the spreader 52. The magnitude of this vertical motion is regulated by adjusting the operator 46 either up the spreader shaft 50 to increase or down the spreader shaft 50 to decrease said vertical motion. The spreader shaft 50, operator 46, and spreader 52 are in a primary position shown in FIG. 4 before air is valved into air chamber 41. In this position the top of the spreader 52 is seated in the grommet 53 preventing a flow of glass spheres. When in the primary position the distance between the bottom of the spreader 52 and the bottom of the shroud 31 must have a one-to-one ratio with the distance between the bottom of the operator 46 and the top of the glass sphere chamber 42.

When air is valved into air chamber 41 and the operator 46 is forced downward, in turn forcing the spreader 52 downward, the spreader's bottom edge and the bottom edge of the shroud 31 may be in line as shown in FIG. 5. The shroud 31 is vertically adjustable to permit this alignment. The glass spheres will flow down the sloping portions of the spreader 52 onto the lip 61 and bounce into the gap between the mutually parallel depending wall 62 of spreader 52 and the interior surface of shroud 31. This restriction of the bounce of the glass spheres causes them to fall substantially vertically. The inside diameter of the shroud 31 should be the same as the width of painted line 60 to be covered. The outside diameter of the flange formed at the bottom of spreader 52 must be in a direct ratio with the inside diameter of shroud 31. The width of the flange at the bottom of spreader 52 must be in direct ratio with the controlled gap between the flange of spreader 52 and the inside diameter of shroud 31. An air shield 57 prevents air currents caused by dispenser 30, movement of other objects encountered in this type of work, or natural environmental factors from affecting the vertical fall of glass spheres. This air shield 57 is made from a flexible, metallic or non-metallic material, and is regulated in length by the distance from shroud 31 bottom to the surface being covered.

Figure 8:
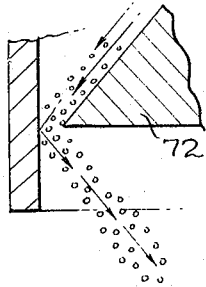
FIG. 8 is an example of prior art showing a partial sectioned view of a portion of a glass dispensing apparatus of the prior art.

The distance between the bottom of the spreader 52 and the bottom of shroud 31 in the down operating position of spreader 52 determines the distribution patterns 63 and 64 of the glass beads on the stripe as shown in FIGS. 6 and 7, respectively. The larger the distance between the bottom of the spreader 52 in the open position and the bottom of the shroud 31, the more glass spheres which are bounced into the center of the line. When this distance is at its maximum for the setting of the shroud 31 in relation to the spreader 52, the distribution pattern 63 is somewhat like that shown in FIG. 6 wherein a greater number of the glass beads fall and land toward the center of the distribution pattern. In order to change the distribution pattern to that of pattern 64 as in FIG. 7 wherein the majority of the glass beads fall around the edge of the circular area covered at one instant of flow, the bottom of the spreader 52 is set to be almost even with the bottom of shroud 31 thereby reducing the number of glass spheres which are bounced in toward the center of the line 60. The advantage of the reduction of such inward bounce is illustrated by the sectioned view of FIG. 5. In this view paint stripe 60 is shown in section as having the greater quantity of paint distributed toward the center of the stripe. With the thickness being heavier at the center and tapering off toward the edges nearly all the glass spheres that fall on the center will stick in place, but due to the thin edge of the binder only a small percentage will stick at the edges. By increasing the amount of glass spheres that fall on the edges of the line, it is possible to have a higher percentage remaining there and therefore a more uniform overall reflectorized line. The prior art type of spreader 72 shown in FIG. 8 has no means thereon to control the inward bounce therefore allowing a great percentage of the glass spheres to land on the middle of the line at its thickest point. This will leave the outer ring which is already sparse through a minimum of paint applied thereon with an end result of a line which has too many spheres in the middle and a shortage of spheres at the outer edges.

Therefore, with the lip and perpindicular walls on the spreader 52 in cooperation with the shroud 31 of the present invention a more equal coverage of the line 60 is assured. In addition, through the adjustments discussed above of the bottom of the shroud 31 in relation to the bottom of the spreader 52 a greater control is obtained over the falling glass spheres than otherwise obtainable in the prior art.

Flexible shield 57 held by adjustable diameter clamp 58 to shroud 31 may also be raised or lowered as necessary in accordance with the height of the bottom of the glass bead dispenser 30 above the road and above obstructions that it may encounter.

It will be obvious to those skilled in the art that various changes may be made without departing from the scope of the invention and therefore the invention is not limited to what is shown in the drawings and described in the specification but only as indicated in the appended claims.

What is claimed is:

1. A glass sphere dispenser spreader for highway marking comprising
 a housing having upper and lower chambers formed therein,
 a sphere confining shroud secured to said housing and depending therefrom,
 said lower chamber communicating with a source of glass spheres and having a bottom plate having an opening therethrough and defining a wall between said lower chamber and the interior of said shroud,
 a valve normally seated in said opening in said bottom plate restricting communication between said lower chamber and the interior of said shroud through said opening,
 and means to control the opening and closing of said valve operatively connected to said valve,
 said valve including
  a frusto-conical portion,
  a cylindrical flange portion on the base of said frusto-conical portion,
  a lip portion at the base of said frusto-conical portion formed by the connection with said flange portion,
  said cylindrical flange portion having a cylindric surface substantially parallel to the interior surface of said shroud, and
 adjusting means to raise and lower said shroud to adjust the relationship between the bottom edge of said shroud and the bottom edge of said cylindric surface during the open position of said valve whereby the distribution pattern of the glass spheres from the dispenser may be controlled.

2. The glass sphere dispenser spreader of claim 1, further characterized by
a flexible screen adjustably attached to said shroud and depending therefrom.

3. The glass sphere dispenser spreader of claim 1, further characterized by
said upper chamber having an inlet port communicating with a source of gas under pressure, and an exhaust port,
said means to control the opening and closing of said valve including
    a diaphragm disposed in said upper chamber so as to prevent gas flow between said inlet and exhaust ports in said upper chamber,
    a valve stem secured to said valve and extending upward therefrom being operatively connected with said diaphragm for movement therewith
and resilient means associated with said valve for urging said valve to a closed position.

4. A glass sphere dispenser spreader for highway marking comprising
a housing having upper and lower chambers formed therein,
a sphere confining shroud secured to said housing and depending therefrom,
said lower chamber communicating with a source of glass spheres and having a bottom plate having an opening therethrough and defining a wall between said lower chamber and the interior of said shroud,
a valve normally seated in said opening in said bottom plate restricting communication between said lower chamber and the interior of said shroud through said opening,
and means to control the opening and closing of said valve operatively connected to said valve,
said valve including
    a frustro-conical portion,
    an outward flaring lower cylindrical flange portion on the base of said frustro-conical portion,
    said cylindrical flange having a cylindric surface depending substantially parallel to the interior surface of said shroud and adjacent thereto spaced from said interior surface so as to allow passage of glass spheres therebetween with rebound of the spheres between said interior surface of said shroud and said cylindric surface with said two surfaces shaped to direct glass spheres in a downward direction substantially perpendicular to the surface of the highway being marked.

References Cited by the Examiner
UNITED STATES PATENTS

| | | | |
|---|---|---|---|
| 1,525,828 | 2/1925 | Reeve | 222—525 X |
| 2,054,881 | 9/1936 | Saunders | 222—525 X |
| 2,673,090 | 3/1954 | Blumberg | 222—518 |

M. HENSON WOOD, JR., *Primary Examiner.*

ROBERT B. REEVES, *Examiner.*

F. H. HANDREN, *Assistant Examiner.*